United States Patent [19]

LaMagna

[11] Patent Number: 4,969,676
[45] Date of Patent: Nov. 13, 1990

[54] AIR PRESSURE PICK-UP TOOL

[75] Inventor: Joseph L. LaMagna, East Windsor, N.J.

[73] Assignee: AT&T Bell Laboratories, Murray Hill, N.J.

[21] Appl. No.: 370,525

[22] Filed: Jun. 23, 1989

[51] Int. Cl.$^5$ ............................................. B25J 15/06
[52] U.S. Cl. .................................................. 294/64.3
[58] Field of Search ............................ 294/64.1–64.3; 269/21; 271/97, 98, 195, 90; 406/88, 152, 153; 414/737, 744 B, 752, 795.5, 797

[56] References Cited

U.S. PATENT DOCUMENTS

| | | | |
|---|---|---|---|
| 3,223,443 | 12/1965 | Misson | 294/64.3 X |
| 3,438,668 | 8/1965 | Olsson et al. | 294/64.3 |
| 3,466,079 | 9/1965 | Mammel | 294/64.3 |
| 3,467,430 | 8/1967 | Lowe | 294/65 |
| 3,523,706 | 8/1970 | Logue | 294/64.3 |
| 4,023,845 | 5/1977 | Schnebly | 294/64.1 |
| 4,566,726 | 1/1986 | Correnti et al. | 294/64.3 |
| 4,710,094 | 12/1987 | Fierkens et al. | 414/752 |

FOREIGN PATENT DOCUMENTS

| | | | |
|---|---|---|---|
| 140432 | 6/1986 | Japan | 294/64.3 |
| 254437 | 11/1986 | Japan | 294/64.3 |
| 105831 | 5/1987 | Japan | 294/64.3 |
| 211236 | 9/1987 | Japan | 294/64.3 |
| 1151497 | 4/1985 | U.S.S.R. | 294/64.3 |
| 748138 | 4/1956 | United Kingdom | 294/64.3 |

OTHER PUBLICATIONS

IBM Technical Disclosure Bulletin, vol. 19, No. 4, Sep. 1976, "Beveled Bernoulli Head" by Cunningham et al.
IBM Technical Disclosure Bulletin, vol. 22, No. 5, Oct. 1979, "Diverted Flow Bernoulli Pick-Up Device" by Balder et al.

Primary Examiner—Johnny D. Cherry
Attorney, Agent, or Firm—Roderick B. Anderson

[57] ABSTRACT

A Bernoulli pick-up tool (10) comprises a head member (11) having a flat major surface (18) and an air passage (16) perpendicular to the major surface and extending through the center of the head member for directing gas at a sufficient velocity to permit a wafer (15) having a flat surface (19) parallel to the major surface of the head and generally centered on the air passage to be suspended in close proximity to the major surface. According to the known Bernoulli principle, the velocity difference of gas flowing along the two surfaces of the wafer creates a pressure differential which permits the wafer to be suspended against the force of gravity. In accordance with the invention, the holding action of the pick-up tool is stabilized by including a cavity (17) in the head member which surrounds the air passage (16). Also, a plurality of elements (23) extend from the periphery of the head member, each adapted to bear against only the periphery of the wafer. The contact surface (25) of these elements is at an angle with respect to the wafer so as to minimize physical contact with the wafer.

5 Claims, 2 Drawing Sheets

4,969,676

AIR PRESSURE PICK-UP TOOL

TECHNICAL FIELD

This invention relates to tools for picking up and manipulating semiconductor wafers, and, more particularly, to such tools which employ the Bernoulli principle.

BACKGROUND OF THE INVENTION

The W. K Mammel, U.S. Pat. No. 3,466,079, granted Sept. 9, 1969, assigned to Western Electric Company, Inc., describes a device employing the Bernoulli principle for picking up semiconductor wafers. The patent points out that alternative devices such as tweezers, vacuum pick-up devices, and other clamping and gripping devices may result in damage or contamination of semiconductor wafers from which highly complex integrated circuit chips are to be made. The Mammel device comprises a head member having a flat major surface through which an air passage extends. The head member is bought into proximity with the wafer while a significant air pressure is directed through the passage at the wafer. As a consequence, the air velocity on one surface of the wafer greatly exceeds that on the other surface to create a pressure differential in accordance with the Bernoulli principle. When this pressure differential is sufficient to overcome the force of gravity, the Mammel device may be used to pick up the wafer without contacting it to any significant degree; rather, a cushion of flowing air separates the wafer from the head member of the pick-up device. A plurality of peripheral extensions on the head member may contact the periphery of the wafer so as to stabilize it.

Wafer pick-up through the use of the Bernoulli principle requires a stable flow of air for giving a stable pressure differential on opposite sides of the wafer. Instabilities can cause the wafer to tilt which in turn changes the air flow distribution and causes the wafer to drop; sometimes the wafer vibrates and may break by repeatedly striking the head member. Greater stability can be achieved in the Mammel tool by providing a large plurality of air passages symmetrically disposed around the center of the head member, rather than a single passage through the center of the member. This, of course, complicates construction of the device, and care must be taken to assure a symmetrical distribution of the pressurized air directed toward the wafer. Moreover, as the diameters of the semiconductor wafers to be picked up with devices of this type increase, the degree of instability likewise increases. Current silicon wafers have diameters of five inches or more, and the expectation is that requirements for wafer diameter will increase in the future rather than decrease.

Related to the problem of instability is the problem of using the Mammel device to vertically orient a wafer. The use of epitaxial reactors requires, at one stage in the processing of a wafer, that the wafer that is initially in a horizontal plane be picked up by a pick-up tool, rotated ninety degrees so as to lie in a vertical plane and then moved horizontally so as to be mounted on a vertical wall within the epitaxial reactor. A Bernoulli principle pick-up tool that can move a wafer from one location to another while maintaining it in a horizontal plane may not work for moving it to a vertical plane because small instabilities may cause the wafer to drop. Gripping elements are sometimes used to overcome this problem, but as was mentioned before, it is desired that the dependence on the gripping of semiconductors be minimized.

For the foregoing reasons, there is a need in the semiconductor industry for a tool for picking up and manipulating a semiconductor wafer, including orientation of the wafer in a vertical plane, while keeping physical contact between the tool and the wafer to a minimum.

SUMMARY OF THE INVENTION

A Bernoulli principle pick-up tool in accordance with the invention comprises a head member having a flat major surface, and an air passage perpendicular to the major surface and extending through the center of the head member for directing gas at a sufficient velocity to permit a wafer having a flat surface parallel to the major surface of the head and generally centered on the air passage to be suspended in close proximity to the major surface. According to the known Bernoulli principle, the velocity difference of gas flowing along the surface of the wafer creates a pressure differential which permits the wafer to be suspended against the force of gravity. In accordance with the invention, the holding action of the pick-up tool is stabilized by including a cavity in the major surface of the head member surrounding the air passage. As will be described later, the cavity directs gas flow from the air passage which, it is believed, tends to make more uniform the radial flow of air along the wafer surface needed for pick-up in accordance with the Bernoulli principle.

In accordance with another feature of the invention, a plurality of elements extend from the periphery of the head member, each adapted to bear against only the periphery of the wafer. The contact surface of these elements is at an angle such as 45 to 60 degrees with respect to the plane of the wafer so as to minimize physical contact with the wafer. As will be described below later, this structure is particularly adapted for moving the wafers into a vertical plane as is required for loading into an epitaxial reactor. When the wafer is in a vertical position, and the air pressure is released, the wafer will be given a slight impetus in the horizontal direction as is convenient for loading into an epitaxial reactor.

These and other objects, features and advantages of the invention will be better understood from a consideration of the following detailed description taken in conjunction with the accompanying drawing.

DETAILED DESCRIPTION

Figure 1:
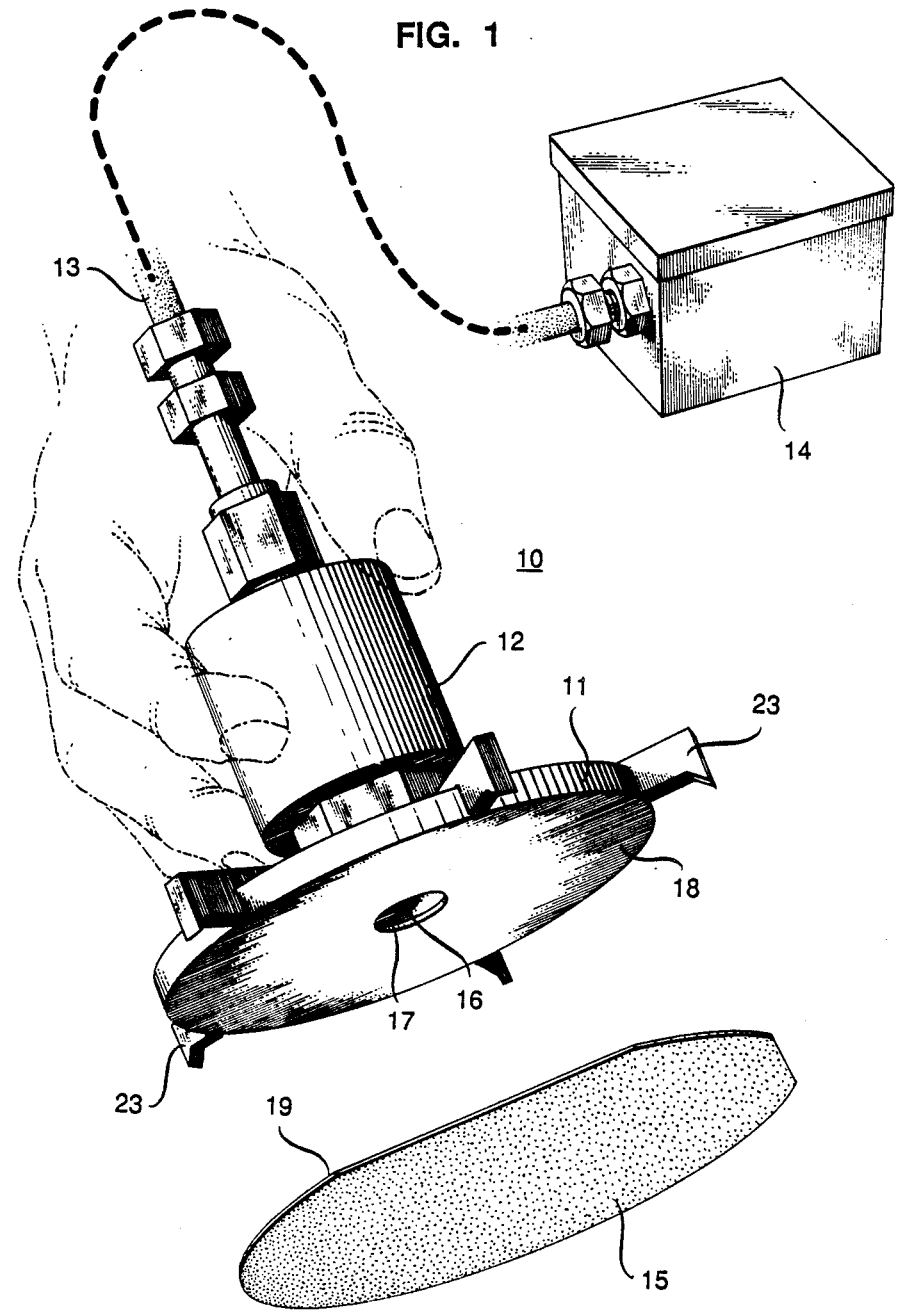
FIG. 1 is a perspective view of a Bernoulli principle pick-up tool in accordance with the invention.

Referring now to FIG. 1, there is shown a Bernoulli principle pick-up tool 10 that may be operated by an operator as shown for picking up a semiconductor wafer 15. The tool comprises a head portion 11, a filter portion 12 and a hose portion 13 connected to a solenoid 14 which in turn is connected to a source of compressed gas. Compressed gas is transmitted by the hose through the air filter 12 and then through a central passage 16 in the head member 11. As is shown more clearly in FIG. 2, a cavity 17 surrounds the central passage 16.

The wafer 15 is picked up by placing a flat major surface portion 18 of the pick-up tool in close proximity with an upper surface 19 of the semiconductor wafer 15. When this is done, compressed gas leaving passage 16 at a high velocity travels radially across the upper surface 19 of wafer 15. In accordance with a well-known principle of physics known as Bernoulli's Principle, when there is a diffential fluid velocity on two surfaces of a structure, a differential of fluid pressure is established on those two surfaces. In the pick-up tool of FIG. 1, the compressed gas establishes a high radial fluid velocity on the upper surface 19 of wafer 15 while, under normal conditions, there is virtually no air or other fluid velocity on the opposite surface. As a consequence, the gas pressure on the upper surface 19 of the wafer can be made to be much lower than the normal atmospheric air pressure on the opposite lower surface of the wafer. When this gas pressure differential becomes great enough to overcome the force of gravity, the wafer can be picked up and held by the pick-up tool against the force of gravity. In principle, this pick-up can be made with no physical contact whatever between the major surface of the tool 18 and the surface 19 of the wafer. For this reason efforts have been made over the course of many years to improve Bernoulli principle pick-up tools for use in the semiconductor industry because of the high standards of cleanliness required in the manipulation of semiconductor wafers; by avoiding physical contact, of course, one greatly reduces the chance for contamination of a wafer 15 during the course of semiconductor processing.

Figure 2:
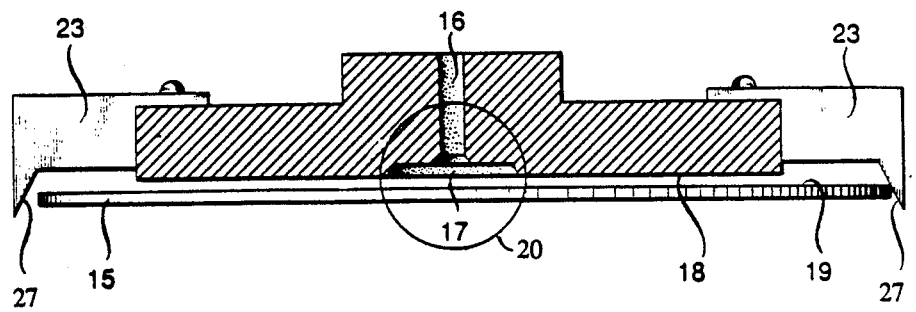
FIG. 2 is a sectional schematic view of part of the pick-up tool of FIG. 1.
Figure 3:
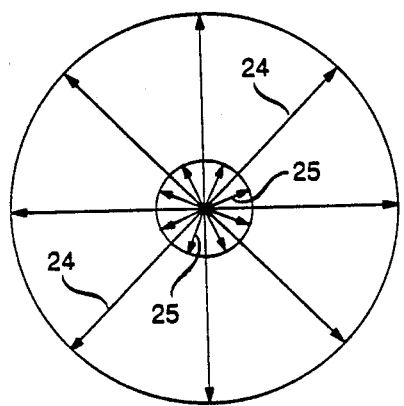
FIG. 3 is a schematic view of air flow along the upper surface of a semiconductor wafer of FIG. 2.
Figure 4:
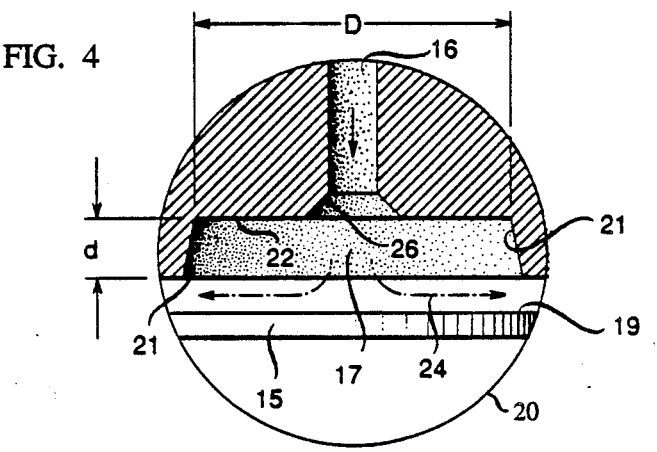
FIG. 4 is a view of an enlarged portion of FIG. 2

As illustrated better in FIG. 2, the presence of the cavity 17 has been found to stabilize significantly the suspension of the wafer 15. As shown in FIG. 4, which is an enlargement of portion 20 of FIG. 2, the cavity 17 is formed by a circular step surrounding the air passage and defined by an annular flat wall portion 22 connected to the major surface 18 by annular wall 21. Because of the slope of wall 21, cavity 17 is preferably in the shape of a conical section; although it could also be in the shape of a cylindrical section. Compressed gas flowing through the passage 16 is illustrated by arrows. When the compressed gas strikes the upper surface 19 of the wafer, it is forced to flow along the upper surface of the wafer in generally radial paths 24 as shown in FIG. 3. FIG.3 also shows by arrows 25 the relatively greater volume of gas per unit of area in the cavity region than over the remainder of the wafer surface area. Because the cavity is symmetrical with respect to the central passage 16, the pattern of air flow 25 is symmetrical as shown in FIG. 3 and this is believed to counteract the effects of small asymmetries in the air flow pattern shown by arrows 24. That is, in the absence of the cavity, it has been found that the wafer often mechanically vibrates rather than being stably suspended. It is believed that small asymmetries caused, for example, by momentary tilting of the wafer can easily set up a resonance in the fluid dynamic patterns illustrated in FIG. 3, such oscillation resulting in the shattering of the wafer. The fluid flow in cavity 17 is believed to be relatively unaffected by such temporary asymmetries and is therefore a stabilizing influence.

The pick-up tool as described thus far can easily and conveniently be used to pick up a wafer lying in a horizontal plane, maintain it horizontally, and then release it in another horizontal configuration. However, when it is desired to carry the wafer vertically, it is preferred that holder elements 23, illustrated in FIGS. 1 and 2, be included on the head member 11. These elements are preferably joined to the head member 11 by screws and are of an appropriate length as to limit movement of the wafer in any direction parallel to the plane of the wafer, as shown in FIG. 2. Specifically, the holders define an edge 27 that extends at an angle of typically between 45 and 60 degrees with respect to the plane of the wafer 15. The edges that might make contact with the wafer describe a circle having a larger diameter than that of the wafer so as to minimize contact to the wafer. While these elements give minimal physical contact to the wafer, they greatly reduce the likelihood of a wafer being dropped if it is to be oriented in a vertical plane. Orientation in a vertical plane is particularly desirable for loading and unloading wafers from an epitaxial reactor of the type that holds wafers in a vertical configuration. The tool, for example, can be used conveniently to load a wafer into an epitaxial reactor by picking up the wafer as shown in FIG. 1, orienting the wafer in a vertical plane, and depositing it in the "wafer pocket" of the reactor by cutting off the air pressure through the central passage. As the holding pressure disappears, the wafer is urged slightly in a horizontal direction by the angled edges 25 of holder elements 23 so that it is dependably deposited in the wafer pocket. The wafer is similarly conveniently retrieved from the wafer pocket with tool 10, and tweezer use during the epitaxial growth step can be eliminated. For wafers of different diameter, e.g., six inches, holder elements 23 of different lengths would be used.

A successful Bernoulli principle pick-up tool for use with five-inch wafers that has been made used a head member 11 having a major surface 18 with a four inch diameter. In any event, the major surface 18 plus wall portion 22 should have an area of at least half the area of one surface of the wafer. The filter 12 was of a type that filtered 0.01 micron particles. Sixty pounds per square inch of nitrogen pressure was applied through the air passage 16 which had a diameter of one-eighth inch, although clean compressed air could be used. The cavity 17 had a diameter D as shown in FIG. 4 of five-eighths inch and a depth d of one-eighth inch. The walls 21 extended at an angle of 70 degrees with respect to the horizontal and corner surfaces 26 preferably extend at 45 degrees, as shown in FIG. 4. As mentioned before, the tool was used for loading wafers into an epitaxial reactor and extensive tests showed minimal contamination of the wafer by the pick-up tool. The wafer diameters were five inches.

Various other designs were attempted with cavities of various sizes, and it was found that cavities one to eight mils in depth did not work satisfactorily. Cavities with greater diameters were also tried. From these tests it was determined the cavity depth d should be fifteen mils in depth or deeper and may be as deep as 150 mils, and that, with these depths, a cavity diameter of five-eighths inches works well and that larger diameters such as 1.25 inches also work. The sloping sidewalls 21 and 26 were found also to contribute to stability. Certain structures would not work if sidewalls 21 and 26 were vertical. Apparently, the sharp corners create eddy currents which can cause instabilities. However, cylindrical cavities of sufficient depth and diameter will work to stabilize operation under certain conditions.

The foregoing is intended only to be illustrative of the principles of the invention. The invention is particularly useful on assembly lines and can be incorporated into robotic apparatus. Various other embodiments and modifications other than those specifically disclosed may be made in practice by those skilled in the art without departing from the spirit and scope of the invention.

I claim:

1. In combination:
    a head member having therein a central gas passage:
    a flat, annular minor surface portion in the head member surrounding the gas passage;
    a flat, annular major surface portion surrounding the minor surface portion and having an area larger than the area of the minor surface portion;
    the flat major and minor surface portions both being substantially perpendicular to the central gas passage;
    the minor surface portion being displaced inwardly in the head member from the major surface portion and being connected to the major surface portion by a step portion, whereby the minor surface portion and the step portion define a cavity surrounding the gas passage;
    a semiconductor wafer;
    the area of the minor surface portion being smaller than the area of one surface of the wafer;
    means for directing gas through the gas passage toward the wafer at a sufficient velocity to permit the wafer, with a flat surface thereof parallel to the major surface portion and generally centered on the gas passage, to be suspended in close proximity to the major surface portion in accordance with the Bernoulli principle;
    the major surface portion being substantially solid and continuous along its entire area, whereby the gas is ejected from the entire periphery of the major surface portion into free space surrounding the head member;
    the cavity has a general shape of a conical section;
    a plurality of elements extends from the periphery of the head member each adapted to bear against only the periphery of the wafer;
    the area of the flat major surface portion plus the area of the flat minor surface portion is more than one-half the surface area of one surface of the wafer;
    the cavity depth is greater than fifteen mils;
    and the step portion interconnecting the minor surface portion to the major surface portion extends at an angle with respect to the flat major surface portion of about 70 degrees.

2. The combination of claim 1 further characterized in that:
    the flat annular minor surface portion has a diameter of at least five-eights inch.

3. The combination of claim 1 further characterized in that:
    the flat annular minor surface portion is connected to the central gas passage by an annular wall that extends at about 45 degrees with respect to the flat annular minor surface.

4. The combination of claim 1 wherein:
    the total area of the major surface portion and the minor surface portion is smaller than the area of one surface of the wafer.

5. A Bernoulli principle pick-up tool comprising: a head member having a major surface which is flat; a gas passage substantially perpendicular to the major surface extending through the head member; means for directing gas through the gas passage toward a wafer at a sufficient velocity to permit such wafer having a flat surface parallel to the major surface and generally centered on the gas passage to be suspended in close proximity to the major surface, characterized in that:
    surrounding the gas passage is a cavity having the general shape of a conical section and a depth of at least 15 mils, which cavity is defined by a circular step portion in the major surface and a flat annular minor surface portion parallel to the flat surface of the major portion and extending from the step portion to the gas passage;
    extending from periphery of the head member are a plurality of elements each adapted to bear against only the periphery of the wafer;
    the circular step portion extends at an angle with respect to the flat major surface of about 70 degrees;
    the flat annular minor surface portion has a diameter of at least five-eighths inch; and
    the flat annular minor surface portion is connected to the central gas passage by an annular wall that extends at about 45 degrees with respect to the flat annular minor surface.

* * * * *